US006872137B2

(12) United States Patent
Singhal

(10) Patent No.: US 6,872,137 B2
(45) Date of Patent: Mar. 29, 2005

(54) METHOD AND APPARATUS FOR AN EDUCATIONAL GAME AND DYNAMIC MESSAGE ENTRY AND DISPLAY

(76) Inventor: Tara Chand Singhal, P.O. Box 5075, Torrance, CA (US) 90510

( * ) Notice: Subject to any disclaimer, the term of this patent is extended or adjusted under 35 U.S.C. 154(b) by 282 days.

(21) Appl. No.: 10/022,762

(22) Filed: Dec. 15, 2001

(65) Prior Publication Data

US 2002/0082068 A1 Jun. 27, 2002

Related U.S. Application Data

(60) Provisional application No. 60/257,793, filed on Dec. 22, 2000.

(51) Int. Cl.[7] ............................................. A63F 13/00
(52) U.S. Cl. ........................................................ 463/9
(58) Field of Search .......................... 463/6, 9, 40–42; 273/153 R

(56) References Cited

U.S. PATENT DOCUMENTS

| | | | | |
|---|---|---|---|---|
| 4,738,451 A | * | 4/1988 | Logg .............................. | 463/2 |
| 5,618,045 A | * | 4/1997 | Kagan et al. ................. | 463/40 |
| 6,224,486 B1 | * | 5/2001 | Walker et al. ................ | 463/42 |
| 6,267,675 B1 | * | 7/2001 | Lee ............................... | 463/40 |
| 6,273,420 B1 | * | 8/2001 | Brooks .................... | 273/153 R |

OTHER PUBLICATIONS

Web page by Colleen Muldoon, Title "Hide and Seek in the Rainforest", 11 pages attached to this Disclosure.
Web page Butterfly Pavillion: Hide N Seek by The Butterfly Pavillion and Insect Center, Westminister, Colorado. One page attached to this disclosure.

* cited by examiner

*Primary Examiner*—Derris H. Banks
*Assistant Examiner*—Corbett B. Coburn, III
(74) *Attorney, Agent, or Firm*—Steve Roeder, Esq.

(57) ABSTRACT

An educational video game with a hide and seek game software and a dynamic message entry and display method which can be played among many players in a fixed location or over the Internet is disclosed. The hide and seek game software has functions that enable the display of a landscape, a hide character, a seek character, and enable the movement of a hide character to hide in the features of a landscape and enable the movement of a seek character to seek the hide character. The game software display a central area with a landscape and a surrounding area, which is used as a space for dynamic display of messages based on age, gender and geographic location of the players. The messages may be from a group of types of commercial, school and community events, social messages for cultivating good habits, and personal messages from friends and relatives.

24 Claims, 18 Drawing Sheets

Player Message List 134

Player ID: YY-MM-G-ZIPCODE-FML  136

RULES: Message Spaces: 3  138A
Message Space: 1 139A : Display Frequency: 4  139B Message Type: Commercial 132C, Message ID 132A
Message Space: 2 139A : Display Frequency: 3  139B Message Type: Community 132C, Message ID 132A
Message Space: 3 139A : Display Frequency: 2  139B Message Type: Event           132C, Message ID 132A SETUP: Message Spaces: 4  138B
Message Space: 1 139A : Display Frequency: 4  139B Message Type: Commercial 132C, Message ID 132A
Message Space: 2 139A : Display Frequency: 3  139B Message Type: Commercial 132C, Message ID 132A
Message Space: 3 139A : Display Frequency: 2  139B Message Type: Event           132C, Message ID 132A
Message Space: 4 139A : Display Frequency: 2  139B Message Type: Event           132C, Message ID 132A HIDE: Message Spaces: 2  138C
Message Space: 1 139A : Display Frequency: 4  139B Message Type: Commercial 132C, Message ID 132A
Message Space: 2 139A : Display Frequency: 3  139B Message Type: Personal     132C, Message ID 132A SEEK: Message Spaces: 3  138D
Message Space: 1 139A : Display Frequency: 4  139B Message Type: Commercial 132C, Message ID 132A
Message Space: 2 139A : Display Frequency: 3  139B Message Type: Commercial 132C, Message ID 132A
Message Space: 3 139A : Display Frequency: 2  139B Message Type: Event           132C, Message ID 132A SCORE: Message Spaces: 4  138E
Message Space: 1 139A : Display Frequency: 4  139B Message Type: Commercial 132C, Message ID 132A
Message Space: 2 139A : Display Frequency: 3  139B Message Type: Commercial 132C, Message ID 132A
Message Space: 3 139A : Display Frequency: 2  139B Message Type: Event           132C, Message ID 132A
Message Space: 4 139A : Display Frequency: 2  139B Message Type: Event           132C, Message ID 132A Player ID: YY-MM-G-ZIPCODE-FML  136

RULES: Message Spaces: 3  138A
Message Space: 1 139A : Display Frequency: 4  139B Message Type: Commercial 132C, Message ID 132A
Message Space: 2 139A : Display Frequency: 3  139B Message Type: Commercial 132C, Message ID 132A
Message Space: 3 139A : Display Frequency: 2  139B Message Type: Event           132C, Message ID 132A

FIGURE 9C

MESSAGE ENTRY SCREEN 150

Message Type: 151

<> PERSONAL 152

<> EVENT 153

<> COMMUNITY 154

<> COMMERCIAL 155

---

PERSONAL MESSAGE ENTRY 156

ID: YY-MM-S-ZIPCD-FML 160

MESSAGE 161 :
Happy Birthday to You Kevin

FROM: 162
Your Aunt in Nebraska

SUBMIT

---

COMMERCIAL MESSAGE ENTRY 157

ACCOUNT ___ PASSWORD ___ 164

DISTRIBUTION: 163
 Age Range
 Territory
 Gender
MESSAGE: 161
Big Mac and Fries are half price for You
FROM: 162
Local Fast Food Restaurant

SUBMIT

---

COMMUNITY MESSAGE ENTRY 158

ACCOUNT ___ PASSWORD ___ 164

DISTRIBUTION: 163
 Age Range
 Territory
 Gender
MESSAGE: 161
Have Good Holidays. See You all Next Year
FROM: 162
WHS Principal

SUBMIT

---

EVENT MESSAGE ENTRY 159

ACCOUNT ___ PASSWORD ___ 164

DISTRIBUTION: 163
 Age Range
 Territory
 Gender
MESSAGE: 161
Basketball Season Tickets are on Sale
8AM - 5 PM M-F
FROM: 162
Sports team

SUBMIT

METHOD AND APPARATUS FOR AN EDUCATIONAL GAME AND DYNAMIC MESSAGE ENTRY AND DISPLAY

CROSS REFERENCE TO RELATED APPLICATIONS

This application claims priority on Provisional Application Ser. No. 60/257,793, filed Dec. 22, 2000, entitled "Internet Based Hide and Seek Game and Dynamic Message Entry and Display" by Tara Chand Singhal. The contents of Provisional Application Ser. No. 60/257,793 are incorporated herein by reference.

FIELD OF THE INVENTION

The present invention is directed to a method and apparatus for an educational game where there is a landscape and characters with specified roles that move over the landscape. The invention is also directed to a method for educational and general purpose message displayed to the players based on the individual player characteristics.

BACKGROUND

With the advance in technology, computers and computer devices have become very common. They are accessible to children of all ages and are widely used for playing games. There are a wide variety of games that are played on the computers. A big quantity of them fall in to the category of fighting and mayhem and are based on bravado and fear. Some of them use grotesque looking creatures. While others fall into the category of sports such as racing, basketball, baseball, etc. Yet another category is games of chance and skill.

Hide and seek game has been around for a long time in many cultures throughout the world. Children play hide and seek games to amuse and entertain themselves. The game is simple but immense fun. The fun comes from finding someone who has hidden himself and is challenging you to find him. If too much time elapses from being cleverly hidden, clues are given such as, making some noise or movement, as there was equal fun in being found. The game requires two or more players. One player hides himself while the other(s) close their eyes and count to 100, allowing a set time for the player to hide himself. Then the other player(s) are to find the player that was in hiding. The fun is in finding the hidden player and how long it takes to find.

In light of the above, it is an object of the present invention to provide an apparatus and method for an electronic version of the hide and seek game with new features that would be useful for entertainment and educational purposes.

SUMMARY

An electronic version of the hide and seek game can use the benefits of electronics and software technology in totally new and interesting ways. This electronic version of the hide and seek game adds dimensions to the game that do not exist in the physical version of the hide and seek game.

The game consists of a computing device with a display screen and a mouse device, and game software. The computing device may be a desk-top computer, a hand held computer, a lap top computer, a video arcade machine or a personal computer connected to a global computer network server. The display screen may also be a projection screen for an audience to see the game being played.

The game software has a hide character, a seek character, a Setup mode, a Hide mode, and a Seek mode. There may also be multiple hide and seek characters as part of a hide team and a seek team. The different modes of the hide and seek game display a central area where the hide and seek action takes place and a surrounding area, surrounding the central area.

The surrounding area, surrounding the central area, is used for the placement of controls, for the placement of starting positions of the hide and seek characters and to display the game score.

The game may be played on a global computer network where the players are dispersed and may or may not know each other. A game server hosts the game and enables the players to participate.

The surrounding area may also be used as a message space for one or more educational and general purpose messages directed to the individual characteristics of players. On the global computer network, a dynamic message entry and display function allows messages to be entered and displayed to the players in message spaces while playing.

DRAWINGS

The novel features of this invention, as well as the invention itself, both as to its structure and its operation, will be best understood from the accompanying drawings, taken in conjunction with the accompanying description, in which similar reference characters refer to similar parts, and in which.

Figure 7A:
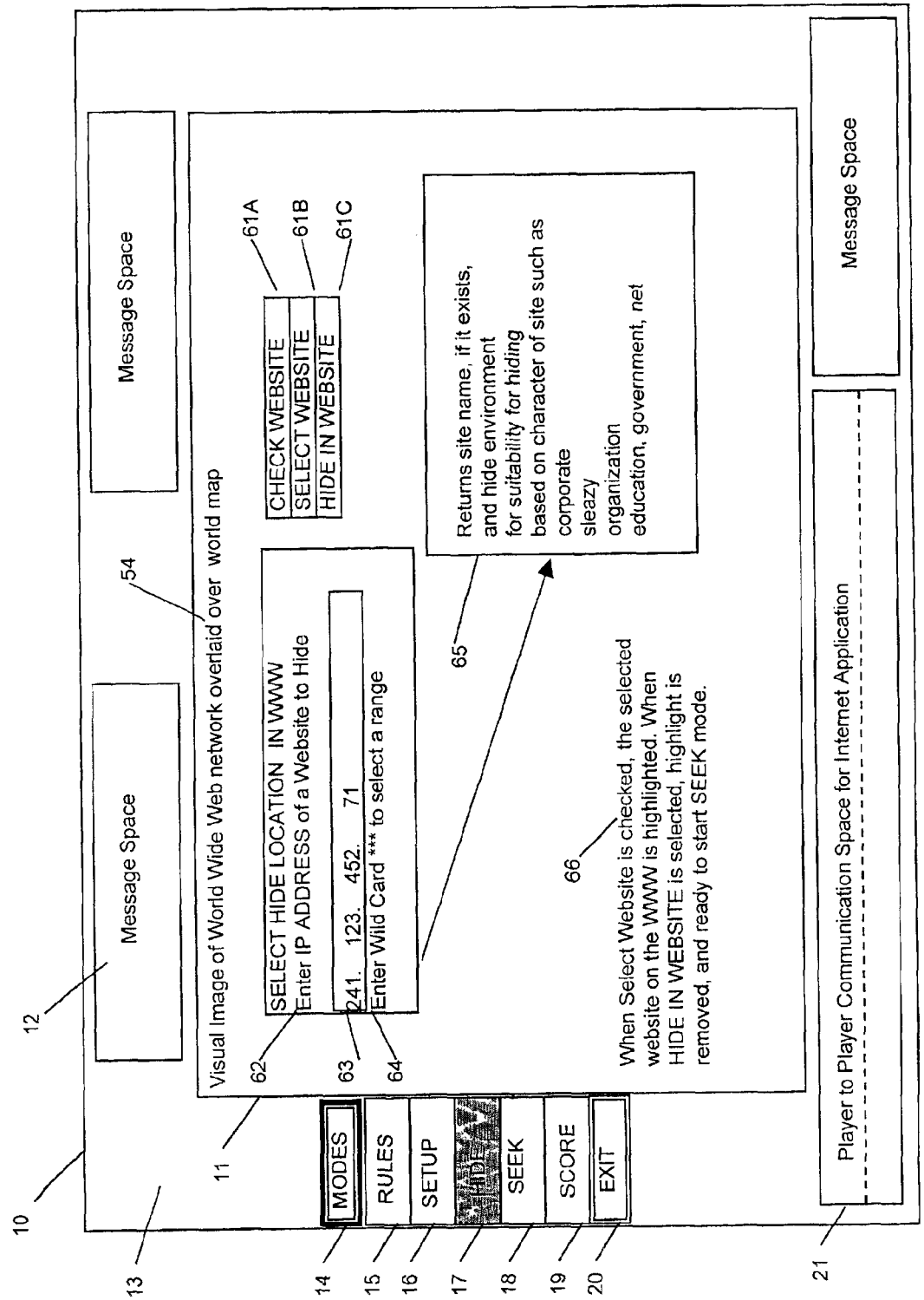
Figure 7B:
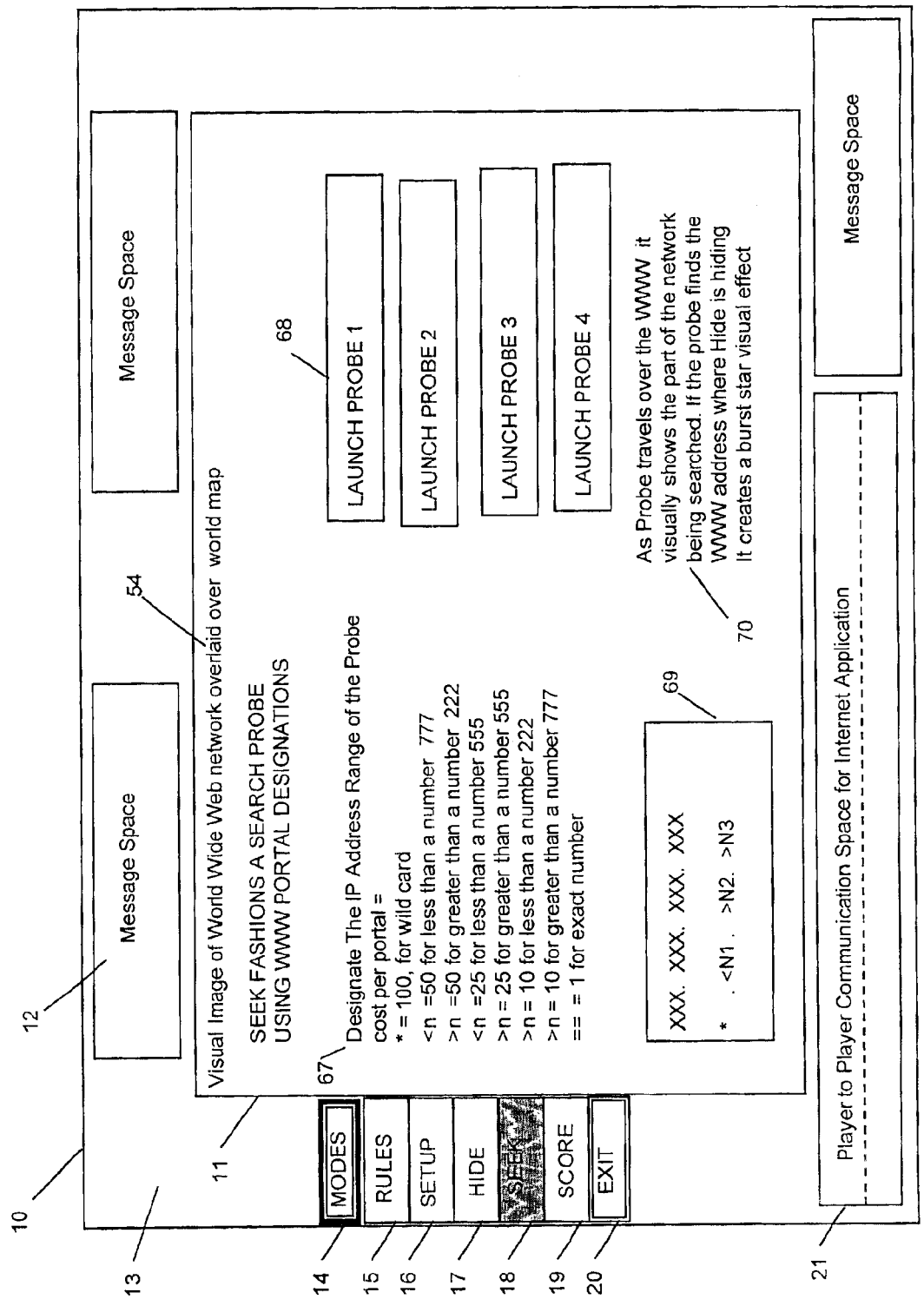
Figure 8A:
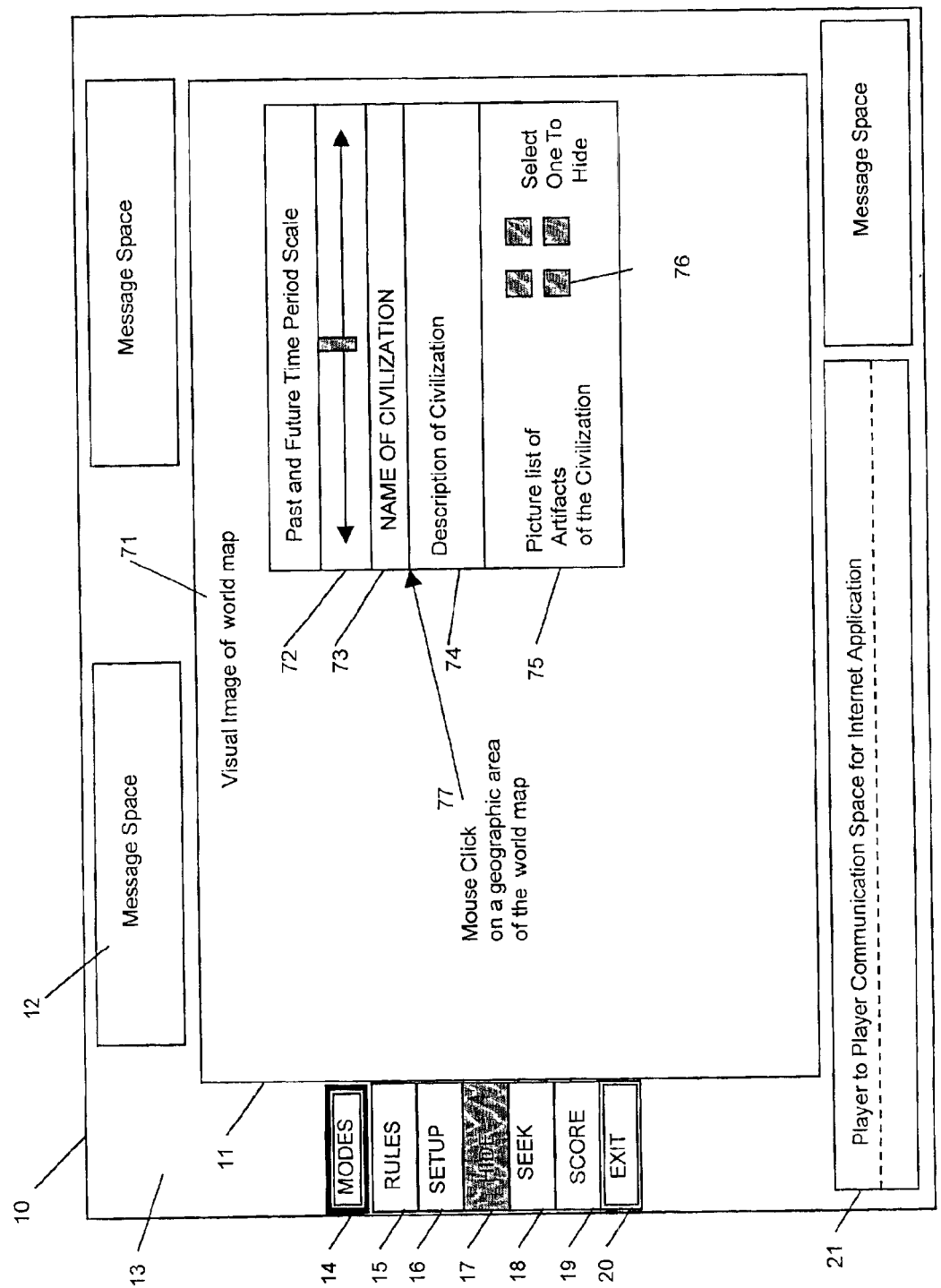
Figure 8B:
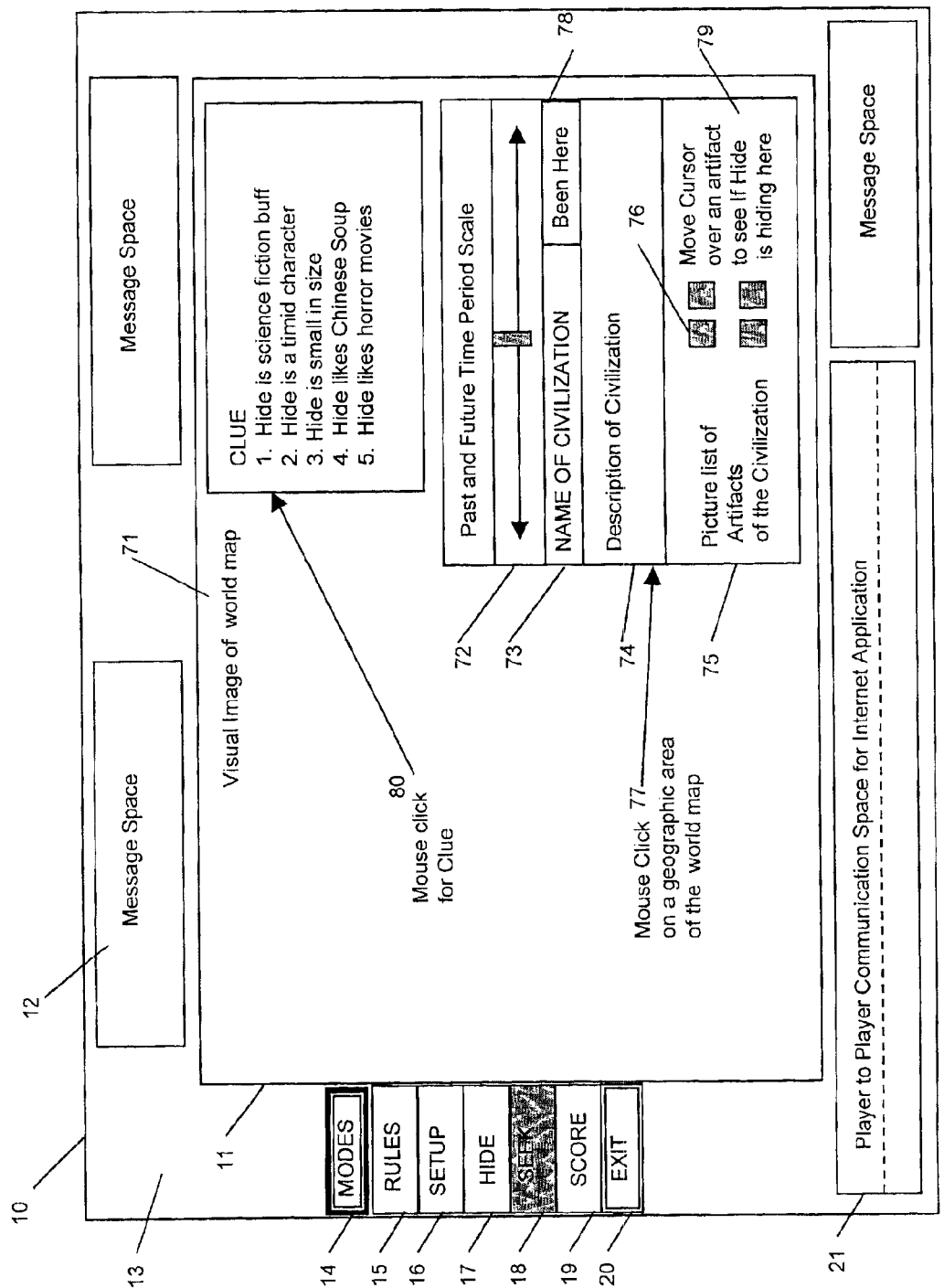
Figures 9A, 9B:
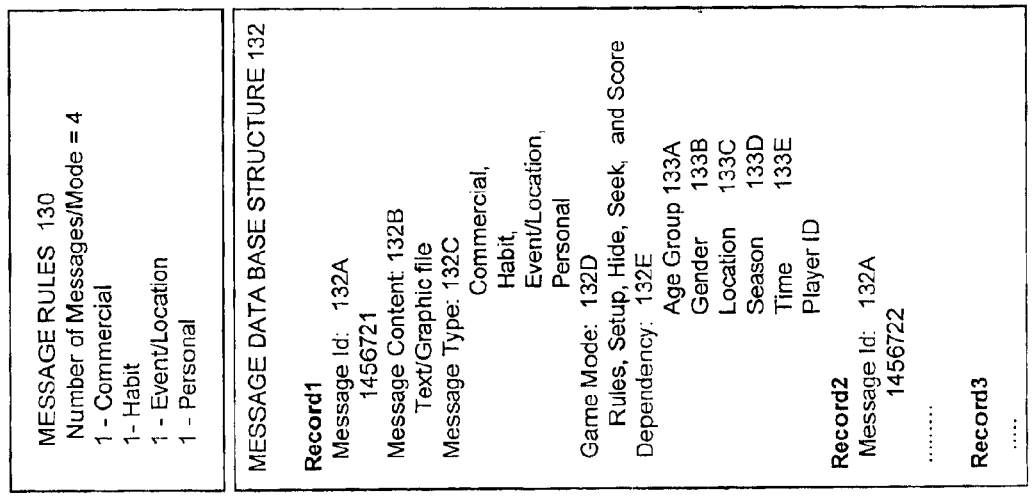
Figures 10B, 10C:
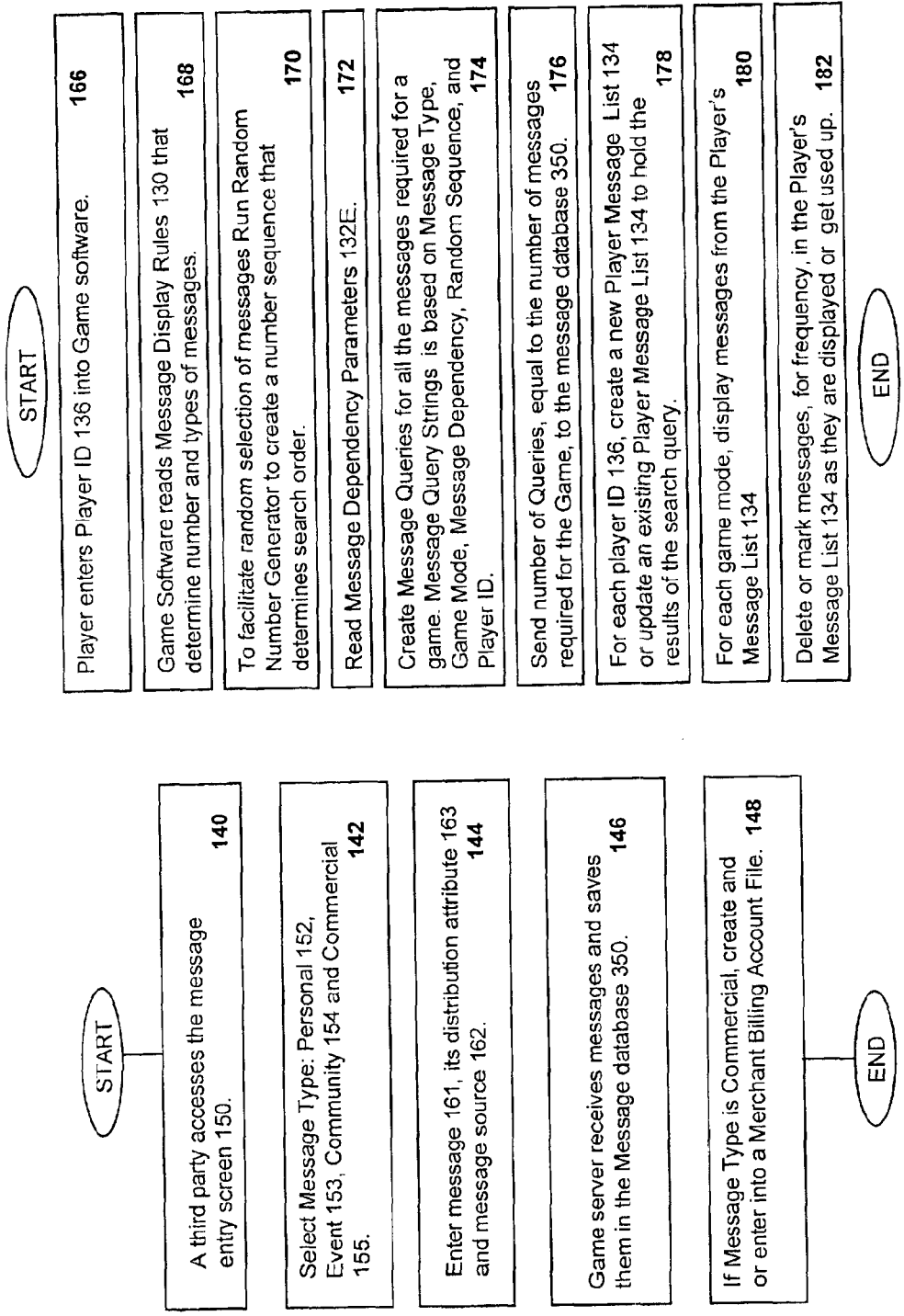

FIGS. 7A–B are simplified illustrations of the World Wide Web Landscape;

FIGS. 8A–B are simplified illustrations of Past and Future Civilizations Landscape;

FIG. 9A is a simplified illustration of Message Types;

FIGS. 9B–C are versions of Message Database structures;

FIG. 10A is a version of Message Entry Interface;

FIG. 10B is a version of Message Entry Flow Chart;

FIG. 10C is a version of Message Selection/Display Flow Chart; and

Figure 11:
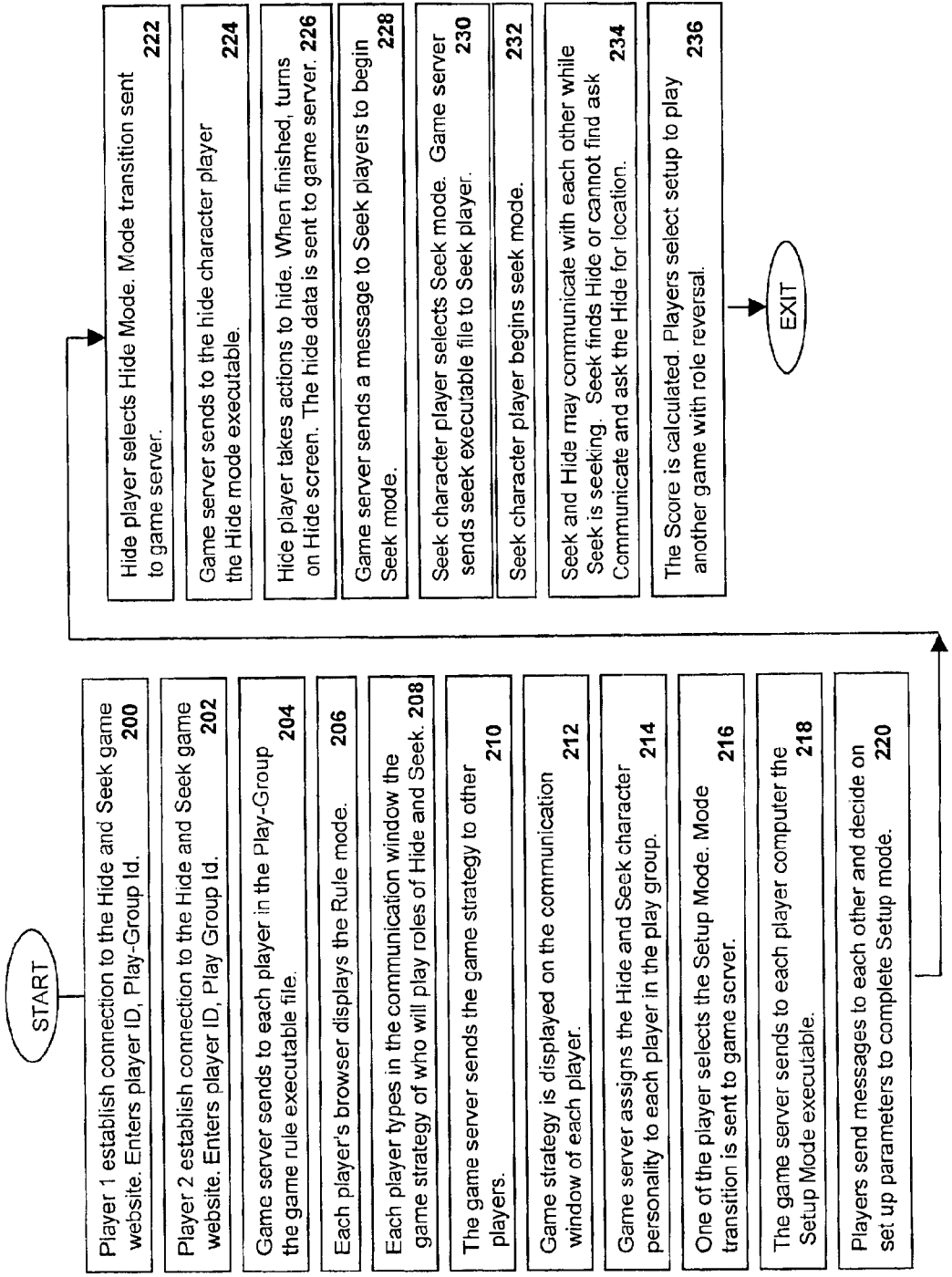

FIG. 11 is a version of Global Computer Network Application Flow Chart.

DESCRIPTION

Overview

Figure 1:
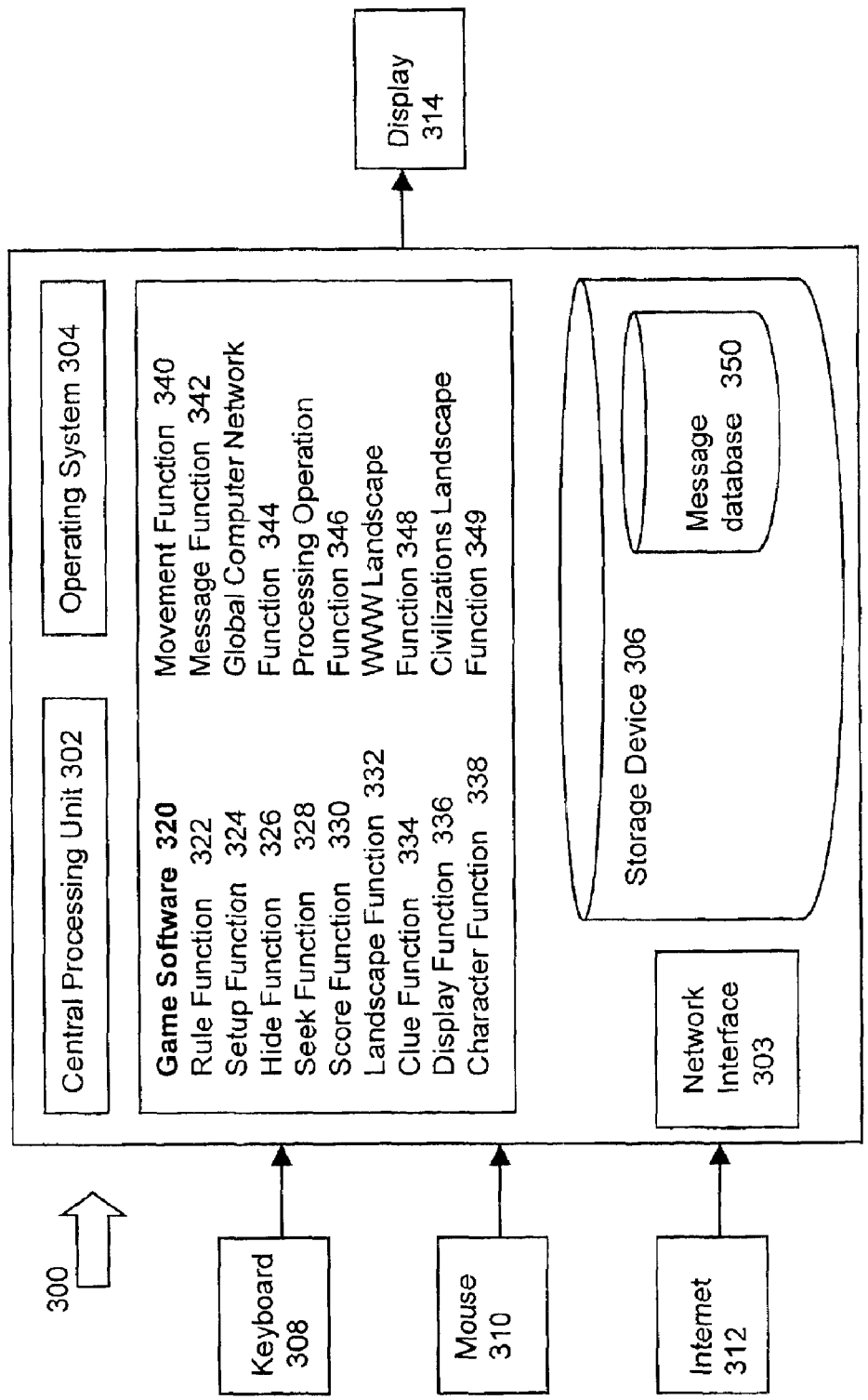
FIG. 1 is a version of Game Apparatus Block Diagram.

With initial reference to FIG. 1, the hide and seek game apparatus 300 is a computing device with a CPU 302, operating system 304, storage device 306, Keyboard 308, Mouse 310, Internet Connection 312, a display 314 and a hide and seek game software 320.

The hide and seek game software 320 provides hide and seek playing modes enabling hide and seek action. The hide and seek game software enables the display of a hide character, a seek character, a landscape, and a plurality of features on the landscape. The game software enables the hide character to move on the landscape and hide in the features. It also, subsequently, enables the seek character to move over the landscape and seek the hide character. The game is played on different types of landscapes, selected by the players for their age level, interest, education and complexity.

The hide and seek game may also have (i) a dynamic message selection and display software, and (ii) a global computer network-based application of the game. The message selection and display software enables dynamic selection and display of general purpose and educational messages to players while playing.

The game may be played on a global computer network where the players are dispersed and may or may not know each other. The game may also be played in restaurant, club and similar public gathering places, where the display is on a projection screen, where the general audience, friends and family members may also watch the actions of hide and seek characters. The detailed description of these features and aspects are described. The headings are provided for the convenience of the reader.

Apparatus 300

The hide and seek game apparatus 300 is a computing device with a display screen 314, a mouse device 310 adapted for use with the hide and seek game and a hide and seek game software 320. The computing device may be a desk top computer, a hand held computer, lap top computer, or a video arcade machine. It may also be a personal computer connected to the global computer network, where a game server computer has the hide and seek game software, which is made available over the global computer network to the personal computer.

Referring to FIG. 1, the game apparatus 300 includes (i) a storage device 306, (ii) an operating system 304 stored in the storage device 306, (iii) a game application program 320 stored in the storage device 306, (iv) and a processor unit 302 connected to the storage device 306

The processor unit 302 can include one or more conventional CPU's. The storage device 306 can include one or more magnetic disk drives, magnetic tape drives, optical storage units, CD-ROM drives and/or flash memory. The storage device 306 also contains a plurality of databases used in the processing of game software functions pursuant to the present invention. For example, as illustrated in FIG. 1, the information storage device 306 can include a message database 350.

Referring back to FIG. 1, the game apparatus 300 includes a network interface 303 that allows the game apparatus 300 to communicate with the others game participants. Conventional internal or external modems may serve as the network interface.

Game Software 320

With reference to FIG. 1, the game software 320 has a Rule Function 322, a Set Up Function 324, a Hide Function 326, a Seek Function 328, a Score Function 330, a Landscape Function 332, a Clue Function 334, a Display Function 336, a Character Function 338, a Movement Function 340, a Message Function 342, a Global Computer Network Function 344, and a Processing Operation Function 346.

The Rule Function 322 provides for the display of rules applicable to the hide and seek game. The Set Up Function 324 provides the setup of parameters by the players applicable to the game. The Hide Function 326 provides the ability to hide by the hide character. The Seek Function 328 provides the ability to seek by the seek character. The Score Function 330 provides for the calculation of the scores. The Landscape Function 332 provides the different landscapes for the characters. The Clue Function 334 provides the clues that may be used in playing the game. The Display Function 336 provides the displays that are used for playing the game. The Character Function 338 provides the hide and seek characters as chosen by the players. The Movement Function 340 provides the ability to move and track the movement of the hide and seek characters over the landscape. The Message Function 342 maintains the messages and provides their display based on player characteristics. The Global Computer Network Function 344 enables the players to play the game on a global computer network. The Processing Operation Function 346 provides for the interconnection of all these functions and the interfaces to and from the Keyboard, Mouse, Internet and the Display devices.

There may be additional functions. As an illustration, WWW Landscape Function 348 provides the ability to play the hide and seek game on a world-wide-web computer network overlaid over a world map. As a further illustration, Civilizations Landscape Function 349 provides the ability to play the hide and seek game on a world map identifying the civilizations. The description of many of these functions is described in more detail here.

Display Function 336

FIGS. 2A through 4 show a hide and seek game display space (10) consisting of a central area (11), that is surrounded by surrounding area (13). The surrounding area (13) is used for the placement of game selection/control actions (14). The surrounding area is also used for the placement of starting positions of the hide and seek characters and the game score.

The surrounding area (13) may also be used as a message space (12). The message space may be a commercial space, where a business may place an advertisement of its product or service to the game players. Alternatively, or in addition, the message space may also be a message regarding cultivating good habits to the game players. Alternatively, or in addition, the messages may relate to school and community events.

Figure 2A:
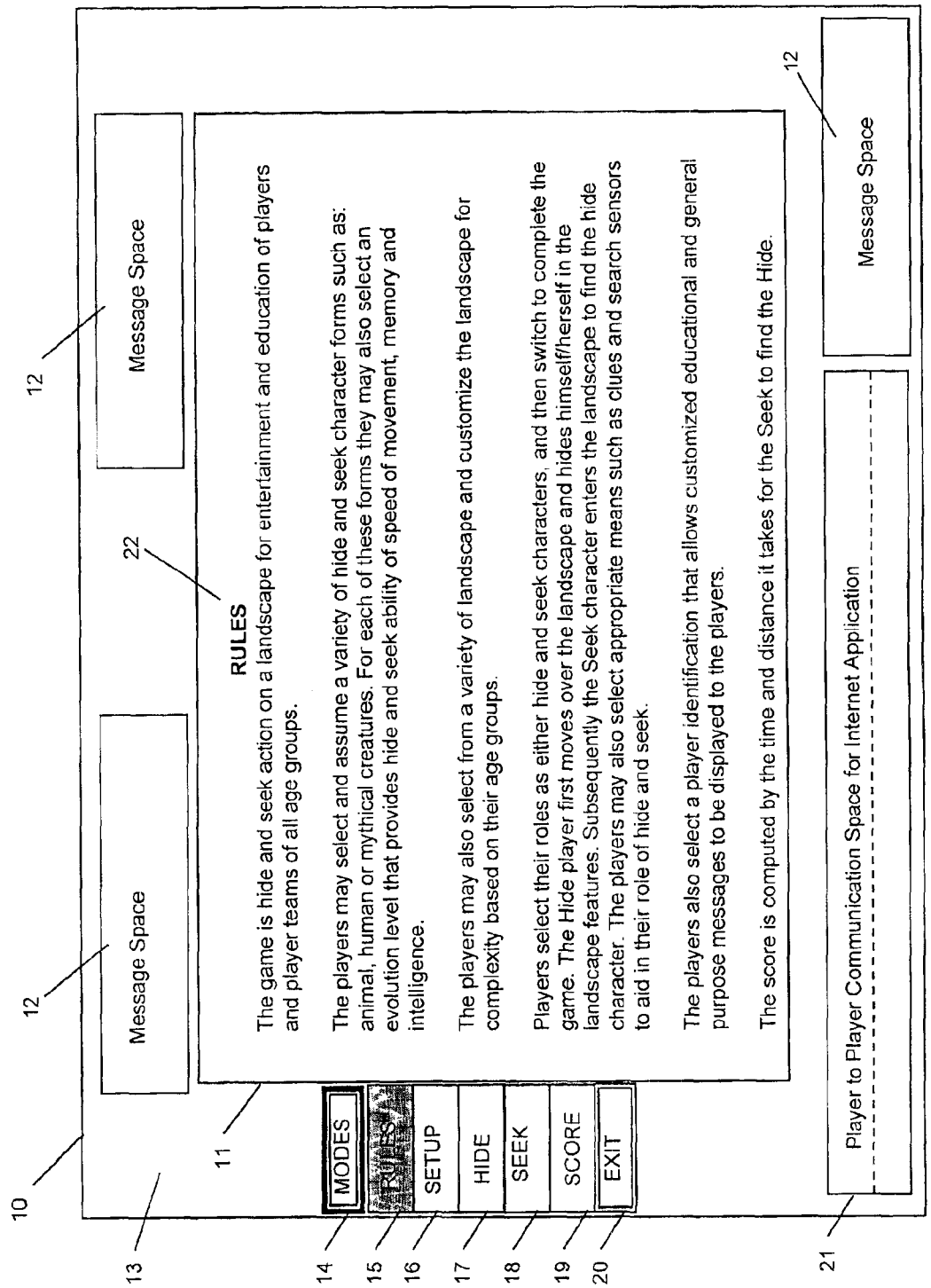
FIG. 2A is a version of Rule Mode.
Figure 2B:
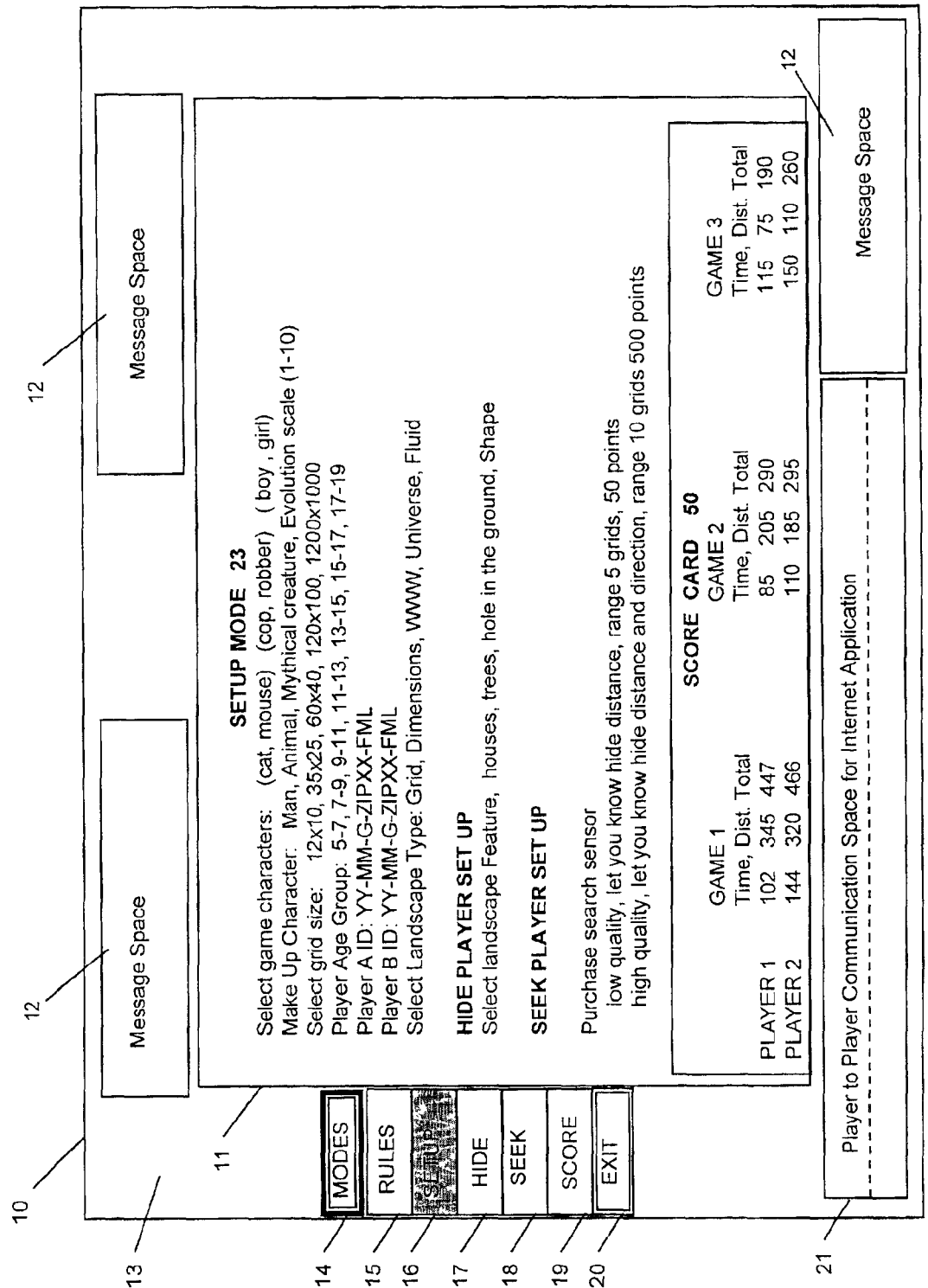
FIG. 2B is a version of Setup Mode.
Figure 4A:
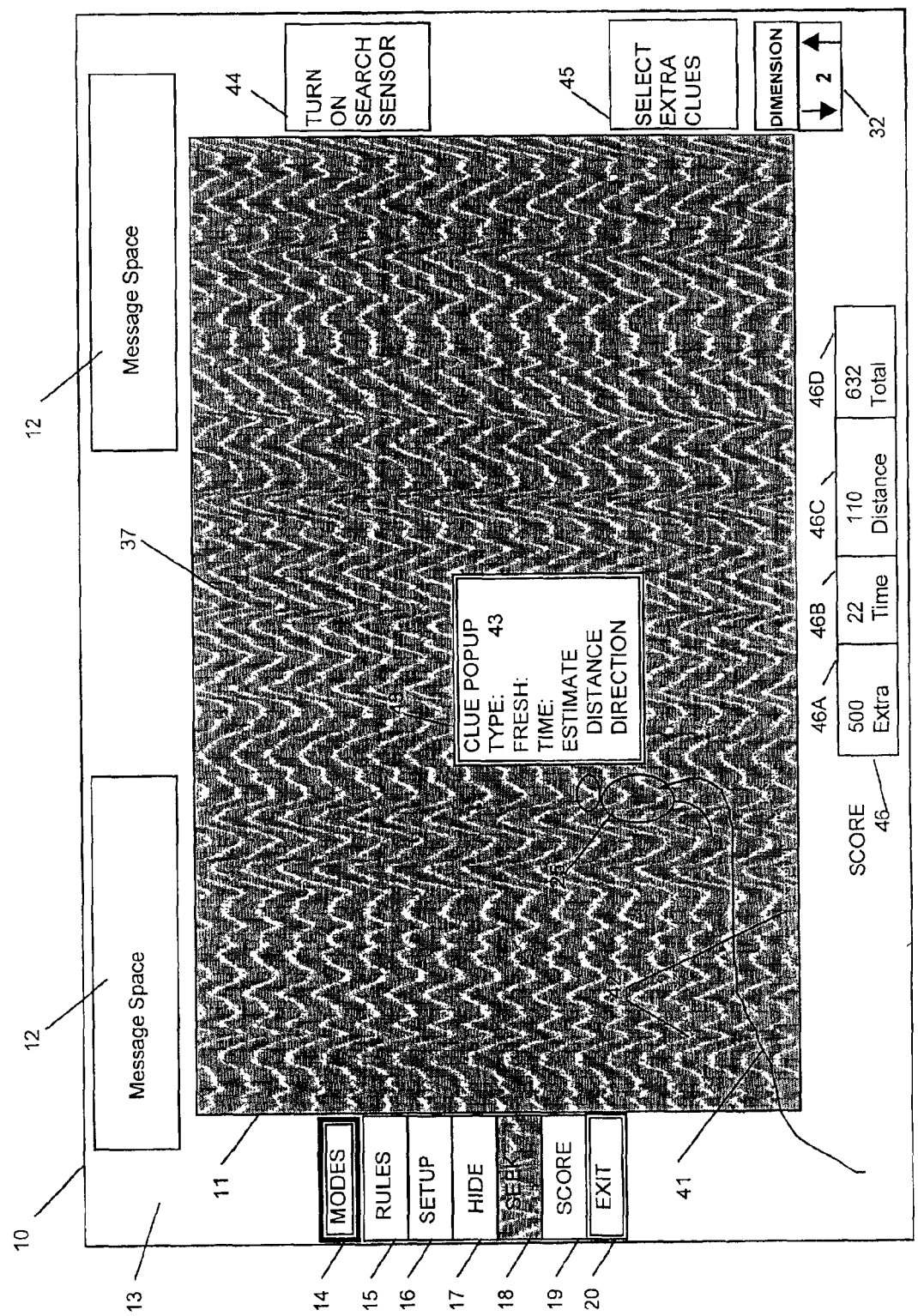
FIG. 4A is a version of Begin Seek Mode.
Figure 4B:
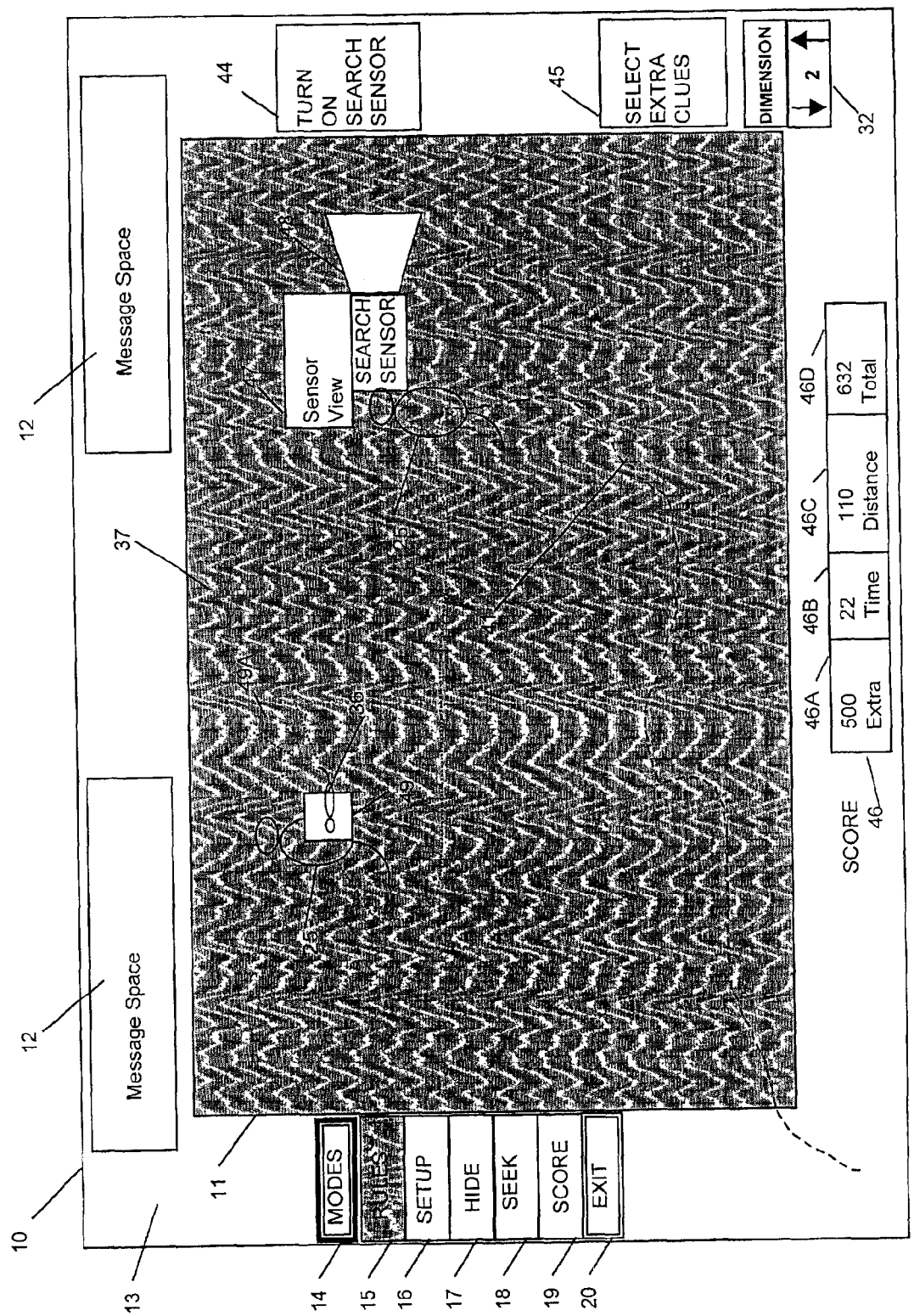
FIG. 4B is a version of End Seek Mode.

As illustrated in FIGS. 4A and 4B, the surrounding area (13) has score display (46) as well as other controls specific to a mode of the game such as landscape dimension (32), sensor selection (44), clues (45), and selection and activation of a hiding screen (33, 34). As illustrated in FIG. 2, the surrounding area (13) may also have an inter-player communication space (21) for a global computer network based application.

Rule and Setup Functions 322–324

FIG. 1 shows the Rule Mode (15), displaying game rules (22) in the central area (11). Rules (22) describe the game and how it is played.

FIG. 2 shows the Setup mode (16) displaying set up options (23) in the central area (11). The Setup mode provides the players the ability to select characters, landscape, game complexity by grid size or age group, and enter player identification.

Hide Function 326

Figure 3A:
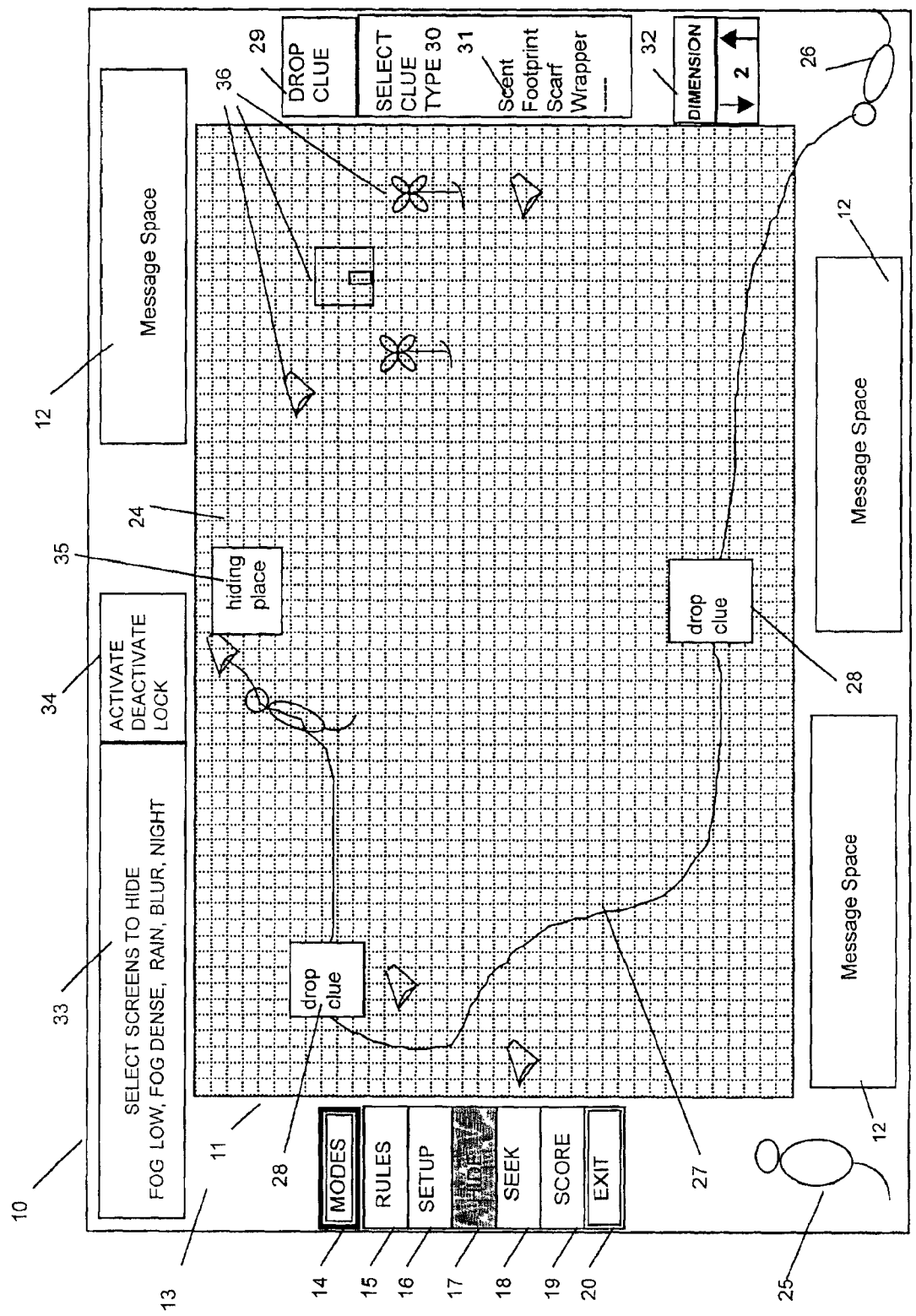
FIG. 3A is a version of Begin Hide Mode.

FIG. 3A shows the Hide mode displaying the landscape (24) with landscape features (36) in the central area (11). A seek character (25) in the form of a cat and a hide character (26) in the form of a mouse are shown in the surrounding area (13). Also shown is a hide screen selection window (33) that enables the hide character to select a screen to hide the landscape (24). The surrounding area (13) shows the clue control (29) and a list of clues (31) enabling the hide character to select the clue (30) it may want to drop. The clues may be selected to confuse or help the seek character in finding the hide character.

The hide character may alter the landscape by placing additional features over the visible grid. The additional features may be holes for mouse hiding, trees for boy, girl, building/boxes for cop robber, house room with furniture hiding for boy/girl or a combination (36). These additional features may be repositioned on the grid by the hide character to help him/her hide and make hiding interesting and fun.

As the hide character (26) travels over the landscape (24), he creates a track (27), drops clues (28), finds a hiding place, and hides in the hiding place (35). The hide character can hide in the landscape in any of the features (36) to make it the hiding place.

Figure 3B:
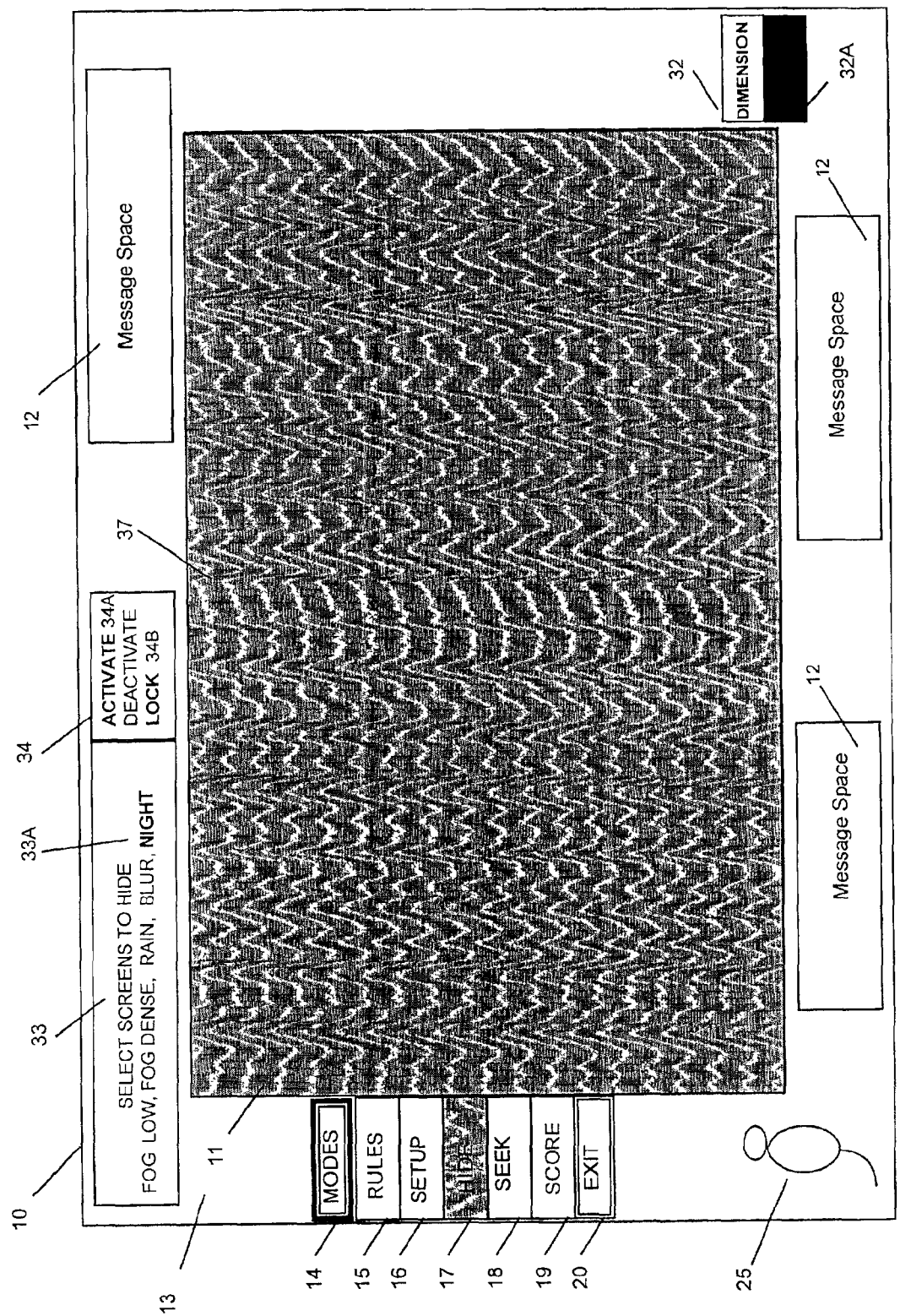
FIG. 3B is a version of End Hide Mode.

As an optional feature, before the Hide mode is completed, the hide character may obscure the landscape making it more challenging to find the hide character. The forms of obscuring the landscape may include creating a night/day/twilight effect and/or a weather effect such as rain or fog. The hide character obscures the landscape by choosing an appropriate screen before ending the Hide mode. FIG. 3B shows that the hide character has completed the Hide mode by selecting the optional hide screen (33). The simplified illustration shows the screen is in the form a blanket (33A), where the landscape (24) is totally hidden by night darkness (37). The hide character selects the screen (33A), activates the screen (34A) and locks it in (34B). When the Hide mode is completed, the hide character is no longer visible any place. The hide screen may be in the form of choices (33) such as, fog, rain, and blur, night, day and twilight.

Clue Function 334

A clue function generates clues. The clues are managed in the form of a clue list with each clue having a record defining the clue attributes. A clue may be displayed to the hide and seek characters by a pop up window that is anchored to the grid location where the clue exists. Clue attributes may have: clue reference, clue type, clue grid location, clue freshness/time code, and clue strength.

As the hide character (26) moves on the landscape (24), he may create clues. The clues assist the seek character in finding the hide character. A clue may have attributes such as type and strength. The type may be in the form of a scent, footprints, or physical evidence such as a piece of clothing or a weapon.

A clue may also have the property of freshness. The freshness of the clue may indicate how far the hide character may have traveled from the clue. The freshness may be graded, which may indicate the distance of the hide character from the clue. The clue may also be in audio form. The final hiding place of hide character may also have an audio property, so that audio in the form of noise or spoken words may be heard by the seek character, giving him an audio clue of the direction and distance the hide character is from the seek character's location. The audio clues may be generated by speakers at the edges of the display screen. For example, stereo speakers are commonly used with personal computers.

The clues may be created automatically as the hide character travels over the landscape. The clue may also be created intentionally by taking an action that creates clues, such as pausing, abruptly changing direction, or deciding to drop an item of evidence. The clues are displayed on a clue pop up window when the seek character is within a predefined vicinity of the clue. For example, the clue window may pop up, when the seek character moves on the landscape, if the clue location is within three grid locations of the seek character's location on the landscape. The pop up window may use color codes to display clue attributes.

Seek Function 328

FIGS. 4A and 4B, show the selection of Seek mode (18). It shows a score window (46), which is made up of different components such as Extra clues (46A), Time (46B), Distance (46C) and Total (46D). The score components of: extra clues selected by the seek character; the time taken in traveling on the landscape in the process of seeking the hide character; and the distance traveled in seeking the hide character, is used to compute the Total score (46D). Any of these three score components may be optional based on the preference and experience of the players.

When the seek character (25) travels over the night landscape (37), he creates a track (41) and sweeps a seek path (42). During the course of his movement, if a clue is encountered in the seek path (42), a Clue Pop-up window is displayed (43). This window shows the type of the clue, freshness of the clue, and time of the clue. It may also show, based on these clues, an estimated direction and distance of where the hide character may be hiding. The seek character may select extra clues (45), if he thinks he is hopelessly lost in finding the hide character. As illustrated in FIG. 4B, he may also use a search sensor (44) by having paid extra score points for its use (46A). The search sensor is deployed (48) and shows the sensor view (47) in the form of an area, as measured in grid reference that is viewed by the sensor. If the hide character exists in that sensor view, the hide character is revealed. The sensitivity of the sensor may be high or low or medium, based on how many game points the seek character is willing to use.

As the seek character travels over the night landscape (37) in the process of seeking the hide character, the score points in the score window (46) may be continuously updated. When the seek character (25) finds the hide character (26), the hiding place is displayed along with the picture of the hide character (49). In addition, audio and or visual cues may also be generated (49A).

While the seek action is going on, the hide character may watch the seek character action to add fun and enjoyment to the game. It may not be disclosed to the seek character that the seek movements during seeking action are being watched by the hide character or even other audience. Other audience not related to the hide and seek characters may also watch the actions of both the hide and seek characters.

Score Function 330

FIG. 2 shows selection of Score Mode (19), selection of which displays a game score card (50) in the central area (11). If the Score mode is selected, the score history, broken down by score time and score distance for all the players is displayed.

Hide and Seek Character Function 336

The hide character and seek character may represent a variety of characters such as: cat and mouse; cop and robber; and boy and girl. The characteristics of the hide and seek characters may also be defined by the players. The players may select characters between the categories of man, animal, or mythical creatures.

For each of these categories, the players may also select an evolution scale. The evolution scale may define the degrees of ability of the hide and seek characters, in regards to speed of movement, ability to travel different landscapes, and to have memory about past games. For, example, older and/or experienced players may select a high evolution scale, while younger and/or inexperienced players may be given default or low evolution scale.

Landscape Function 332

Figure 5:
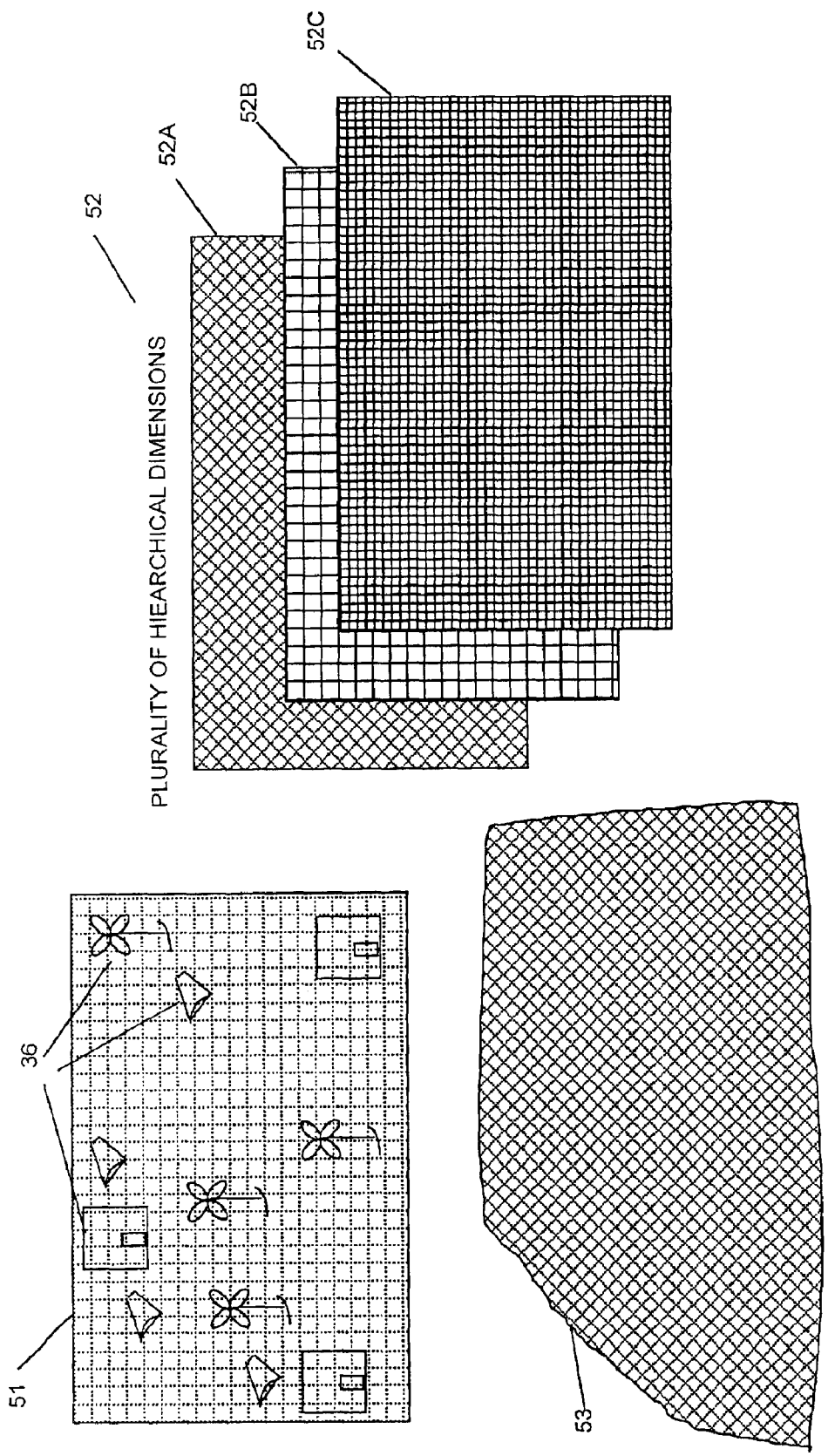
FIG. 5 is a version of Landscape Types.

The landscape in the central area may have a wide range of designs and features. FIG. 5 shows simplified illustrations. The landscape area may have a visible grid. The grid may be made of squares or rectangles (51). The grid may consist of horizontal and vertical lines, or it may consist of diagonal lines. The grid provides a reference in the landscape for tracking the movement of the hide character and seek character and for locating and anchoring clues and the hiding place of the hide character. The grid may consist of any number of squares such as 10×10 suitable for very young players to as much as 1000×1000 or larger for older players. The complexity of the game is a function of the grid size. A preferred grid size may be 120×100. The landscape may be square shape, rectangle shape or it may also be an odd shape (53).

The landscape may be partitioned in a plurality of hierarchical landscapes, permitting the hide and seek characters to travel in any hierarchy of the landscape (52). Each hierarchy level is overlaid over the previous hierarchy level, so that by selecting a dimension representing a hierarchy, the player is exposed to a new landscape for that dimension (52B–C). A player may hide in a dimension level and then within a location of the landscape of that dimension level.

Selecting a dimension (32), as illustrated in FIG. 3A, extends the landscape in hierarchical dimensions. The dimension travel and the degree of dimensions may be restricted based on the evolution scale of the hide and seek characters. The higher the evolution scale of the players, the more dimensions they can travel into, making the hide and seek game challenging, interesting and fun for players of all ages and skills. The evolution scale of the hide and seek characters is selected by the players as a part of the setup.

The landscape may also be in the form of the WWW (world-wide-web). The landscape may also be in the form of galaxies, solar systems and planets. The landscape may also be in the form of a body of fluid in which viruses may exist. The landscape may also be in the form of a surface of an alien planet. The landscape may also be in the form of a large body of fluid such as oceans. The landscape may also be in the form of past and future civilizations. It may be any other form suitable for a hide and seek game. Later, with reference to FIGS. 7 and 8, simplified illustrations are provided for the WWW and the Civilization landscapes.

Processing Operation 346

Figure 6:
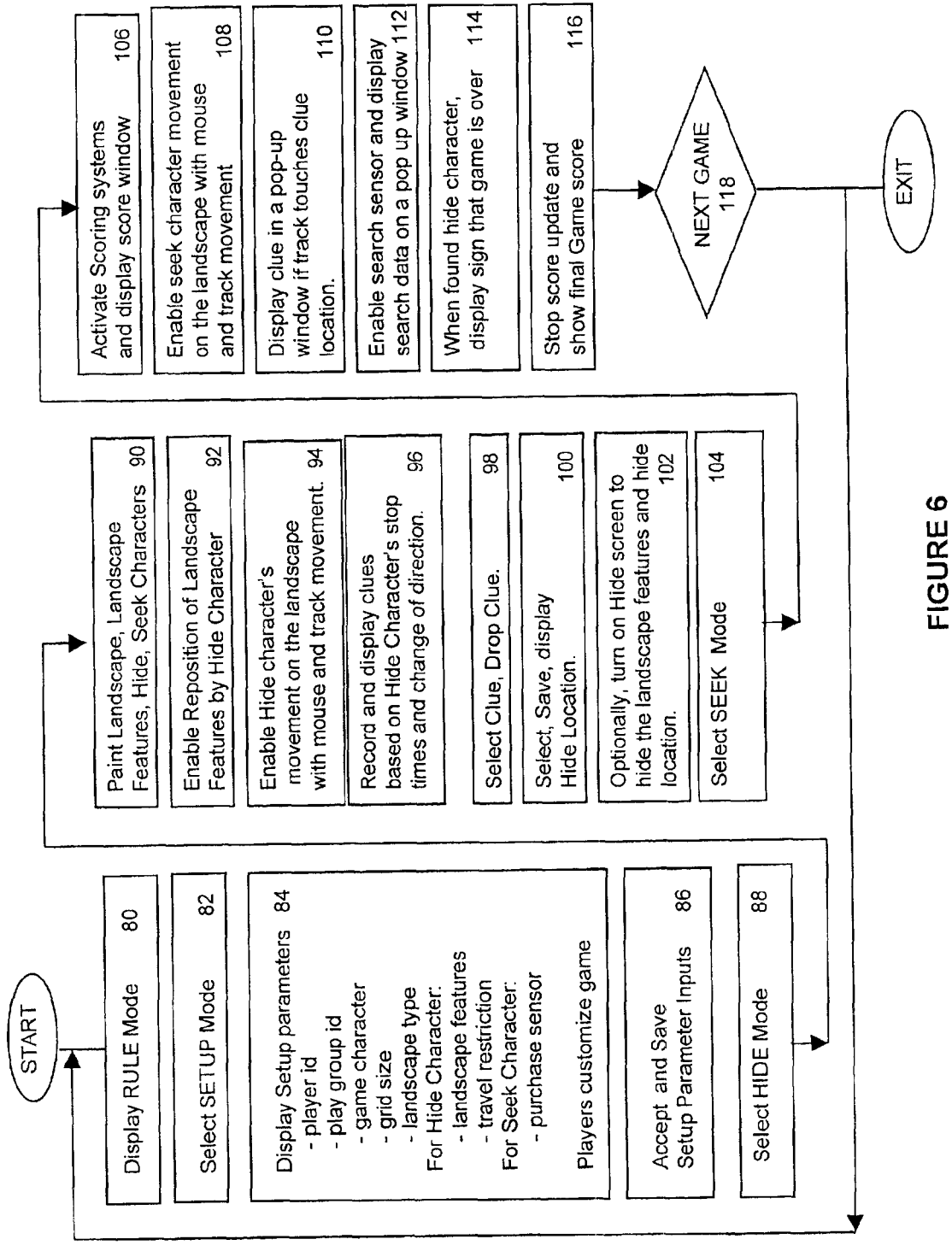
FIG. 6 is a version of Game Flow Chart.

FIG. 6 shows a version of hide and seek game flow chart. On starting the game, the Rule mode is displayed (80). On selection of Setup mode (82), the Setup parameters are displayed (84). Set up requires selection of grid size on the landscape. Players may also select the identity of the hide character and seek character from a list of characters such as cat/mouse, cop/robber, boy/girl etc. They may also define their own characters.

The set up for the seek character may require him to select a sensor to aid in seeking. The sensor may be the economical model or the deluxe model. The economical model sensor, when activated by the seek character, alerts him/her if the hide character is hiding in the limited grid area surrounding the sensor. If the sensor is the deluxe model, the sensor shows the direction where the hide character is hiding. The seek character may select the sensor in advance and pay for it by points that become part of the score.

The seek character may also select and pay for extra clues, which he/she uses when he/she is hopeless and has no clue where the hide character is hiding. After the set up is completed, the Setup parameters are accepted and saved (86). The hide character begins the Hide mode (88). The landscape features are displayed along with icons representing the hide and seek characters (90). Optionally, the hide character may reposition landscape features such as trees, houses etc. (92).

The hide character physically moves over from the surrounding area to the central area where the landscape is and moves in any direction he desires with the help of the mouse device (94). The mouse device is used to select the hide character and move it and then stop. The hide character may perform many move/stop actions using the mouse device. A visible track indicator in the form of a line where the hide character has moved is generated. During the hide character's movement, clues are generated (96). The hide character may also leave clues by activating the clue icon and selecting from a list of clues (98). When the hide character has made a decision where to hide in the landscape, the hide character positions itself on the desired grid. The grid location references the hiding position to the game software (100). When the hide character hides in a landscape feature, he is visible to himself on the landscape.

After hiding, the hide character ends the Hide mode (102). At that time, the hide character cannot be seen. After hiding, the hide character may also activate a hide screen. At that time, neither the hide character nor the landscape features under which he may he hiding are seen. This ends the Hide mode so that the seek character may begin the Seek mode.

On selection of the Seek mode (104), the scoring system is activated and the score window is displayed (106). The seek character then physically moves on to the landscape and moves about to find the hide character (108). During his movement if he happens to come in the vicinity of the location where a clue was left, a pop up window opens, telling him that he has a clue and what the clue is (110). Then the seek character continues his search and may also use a search sensor if he purchased one as part of set up (112). The search sensor when activated, informs the seek character if the hide character is hiding within a block from where the sensor was activated. The seek character continues his search with the help of clues and the search sensor.

As the seek character moves about on the landscape, time and distance is recorded in the score card window. When the seek character physically moves over the hide character location, a pop up window opens up letting the seek character know that the game is over (114). At that time the score is updated and the game score is displayed (116). Another game may then be started (118) with the reversal of the hide and seek identity, if the players so choose, or the game may be exited using EXIT control.

WWW landscape Function 348

FIG. 7A shows a simplified illustration of the Hide mode in the World Wide Web (WWW) landscape. WWW is a world-wide network of computers that are connected to each other in a network. The computers are also called nodes of the network and are referenced or identified by a physical name, "called a domain name", as well as a numerical Internet Protocol (IP) address. As a simplified illustration, the domain name may be www.Wishmewell.com with a corresponding IP address being 100.129.75.122. The IP address is a path name that defines the actual connection path to reach this computer over the world-wide-web. Users type the domain name to reach a given computer node or they may directly type in the IP address. If they typed in the domain name, a centralized directory maps the domain name to the IP address. The IP address is then used to establish a path and a connection to the computer node referenced by the domain name.

Many businesses and individuals all over the world have established web sites for them selves that are identified by the domain name and an IP address. Such web sites may number in the millions. These web sites may be very simple belonging to individuals or may be complex if belonging to businesses. Anyone, with a computer, a browser software and a global computer network connection may connect to or "travel" to any of these web sites and see the visual and audio content at these web sites.

This invention uses the structure of World Wide Web to create a landscape where the hide and seek action may be performed. For the purpose of the hide and seek game as described here, a WWW type of landscape may be a visual representation of the world wide network of connections, with computers as nodes, overlaid over the world map.

The hiding is done in one of the websites of the world-wide-web as referenced by its IP address (62). The hide character selects an IP address for hiding (63). Alternatively, wild card entries to select a range of IP addresses can be made (64). A wild card is a special character such as a question mark or an asterisk that is used to mean any character. The game software checks and displays whether the address is active, its name and its hideabilty environment (65). The hide character can click CHECK WEBSITE (61A) button to check the website, can click SELECT WEBSITE (61B) to select the website, and can select the HIDE IN WEBSITE (61C) button to hide in the website. When a website is selected it is highlighted for visual display (66).

FIG. 7B shows a simplified illustration of the Seek mode in WWW landscape. The seek character to seek the hiding place of the hide character in the WWW landscape designs a probe (67) which travels over the worldwide web to find the website in which the hide character is hiding. The probe is made by specifying the IP address digits by using wild card designations or by other designations that represent a more restricted range of numbers such as digits greater than or less than a number (69). The cost of probe is in game points based on the reach of the probe. The seek character launches one or more probes (68). As the probe(s) travels over the network of computer nodes, it visually shows the part of the network being searched. If the probe finds the WWW address of the hide character, it may create a visual effect (70) to indicate the hiding website of the hide character.

Civilization Landscape Function 349

FIG. 8A shows another simplified illustration of the Hide mode for the landscape in the form of past and future civilizations. The hide character may hide in one of the artifacts of a civilization (76). The landscape is represented as a world map (71), where clicking with the mouse on a geographic region, would pop up a window (77). The window will show a time scale, allowing the characters to scroll backward or forward in time (72). As the time scrolls, the rest of the window for the scrolled time period identifies the civilization (73) from that geographic region, gives a brief description (74) and lists a set of artifacts of that civilization (75). The hide character may hide in one of the artifacts listed (76).

FIG. 8B shows a simplified illustration of the Seek mode for the landscape in the form of past and future civilizations. The seek character, before beginning his search, may click on a set of clues (80). These clues are disguised statements about the civilization and the artifact that the hide character may be hiding in. Using these clues, the seek character may plan his search strategy. The seek character clicks on a geographic region (77) to pop open a window with a time scroll (72). As he scrolls time periods and sees civilizations, the seek character looks for the hide character by mousing over the artifact representations (79). In computer technology the term "mousing over" indicates that when the cursor is placed on an object, it changes color or shape. If the hide character is hidden in one of the artifacts, moving the mouse over that artifact changes the color of the artifacts and may give other indications that the hide character is hidden here. If the hide character has been in that civilization through his travels, that may be indicated as a display "Been There" (78) so that the seek character knows which civilizations the hide character has been through in the process of hiding.

Message Function 342

As illustrated in FIGS. 1 to 4, the messages are displayed in message spaces (12) in the surrounding area (13) of the hide and seek game. The message selection may be dynamic as it may change from mode to mode and from game to game in playing the hide and seek game.

The method of message selection and display as described here may also be used in other games, besides the hide and seek game described in this invention. The list of messages may be revised over time to include new messages. In a global computer network based application of this game, the message list may be updated on a continuous basis by a message entry interface. In other applications it may be updated upon using new versions of the game software.

The entry of messages and their selection for display is facilitated by a player identification means described below. FIG. 9A provides a simplified illustration of message types; FIGS. 9B and 9C provide an illustration of message database structure; FIGS. 10A and 10B illustrate message entry interface and; FIG. 10C provides a simplified illustration of message selection and display operation.

Player Identification Means

The player identification means is an anonymous structured identification means. This player identification means enables the message display to an individual player or to class of players based on gender, age group or geographic location that a commercial message distributor or a community group may find useful. The message display to an individual player may be related to a personalized special event from family members. This identification means is anonymous, in that a player does not need to open or maintain an account with the game software.

A game player as part of the Setup mode may enter his anonymous player identification. The player identification means may be in the format of YY-MM-G-ZIPCD-FML, where YY-MM is the year and month of birth of the player, G is the gender as F or M, ZIPCD is the zip code, where the player lives and FML are his first, middle and last name initials. This identification means is preferred as being unique, easy to remember and still preserving the anonymity of the player.

The zip code assigned by postal service to a geographic area is based on people density of the geographic area. In an area defined by a zip code there may be 25,000 people. Using the above player identification means there may be as many as 20 (the range of age) times 12 (number of months) times 2 (gender) times (26×26×26) (name initial combinations)=a number over 8 million unique identification means for each zip code. Therefore, it is believed, this is a unique anonymous player identification means.

This player identification is used in the message list to identify a particular message for the player. A family member using this player identification enters a special message for the player via a global computer network access to the server computer hosting the game. When a player connects to the game server, and enters his player identification as part of the Setup, this player identification is used to access the special message and display it during the game.

Message Types and Database Structure

FIG. 9A shows examples of four messages types. These are: Personal messages (120), Community messages (122), Event messages (124), and Commercial messages (126).

With reference to FIG. 9B and C, the message data that supports the selection and display of messages includes Message rules (130), Message database structure (132) and Player Message List (134). The message rules (130) define the number of messages that may be displayed as well as the type of those messages. For example, the display of messages may be limited to four in each mode of the hide and seek game. The message content type may be defined as no more than one commercial, one habit, one event and one personal message.

The message database structure (132) provides message and attributes that support message selection. Each message record includes message identification (132A), message itself in the form of text or a graphic file (132B), message type (132C) of commercial, habit, event/location or personal, game mode (132D) of Rule, Setup, Hide, Seek or Score, where this message may be displayed, and a message dependency field (132E). The dependency field has suitability of the message for an age group (133A), gender (133B), geographic location of the players (133C), season (133D), and time of day (134E). The dependency field may also have player identification for a personal message.

To facilitate selection and display of messages, each time a player connects to the game with his player identification means, player message list (134) is created or an existing list is updated. With reference to FIG. 9C, a simplified illustration of a player message list (134) is provided. The messages that are applicable to a given player based on his player identification means (136) are copied over to this list. These are displayed during the modes and in appropriate message places in the surrounding area. For each mode, number of message spaces (138) are defined along with attributes of each message such as: Message space (139A), Display Frequency (139B), Message Type (139C) and Message Content (139D). Message space (139A) defines the location of the message (12) in the surrounding area (13). Display frequency (139B) defines how many times this message is displayed.

Message Entry

FIG. 10A shows that by using a web browser interface, anyone, anywhere can enter a message using a Message Entry Screen (150). The messages may be of four different types (151). Selection of PERSONAL (152) allows a Personal Message entry screen (156) to be opened. The message may be personal in nature and is directed to one specific player. The player Identification in the form of YYYYMM-G-ZIPCD-FML is entered (160). This being a unique player identification, it is composed of well know information elements that are known to the relatives and close friends of the player, who may want to send a personal message. The Message is entered (161) and FROM is entered as well (162).

Similarly, other message types of: Event (153); Community (154); and Commercial (155) are entered by their corresponding message entry screens as illustrated (159), (158) and (157) respectively. In these message entries, the account and password (164) is utilized to make sure only authorized persons can enter messages to the message database. The distribution of the message by age, territory and gender of the players is specified (163). Then the Message (161) itself and who it is From (162), is entered.

FIG. 10B shows a flow chart of how the messages are entered into and processed by the game server. Third parties access the message entry screen (140). They select from Message Types of Personal, Event, Community and Commercial (142). They enter the message, its distribution and its source (144). Game server receives messages and saves them in message database (146). If the message is Commercial Type, create and enter into a Merchant Billing Account File (148).

Message Database 350

The message database 350 stores the message rules 130, messages content using message database structure 132 and message player List 134.

Message Selection and Display Operation

With reference to FIG. 10C, a player enters his player identification in the format defined earlier to the game software (166). The message rules 130 are read from the message database 350 (168). To facilitate random selection of messages a Random Number Generator is run to create a number sequence that determines search order (170). Message Dependency Parameters are read (172). Database message queries for all the messages required for a game are created. Message queries are based on Message Type, Game Mode, Message Dependency, Random Sequence, and Player identification. (174). Number of Queries equal to the number of messages required for the game are sent to the message database (176). For each player identification, a new Player Message List is created or an existing Player Message List is updated to hold the search results of the query (178). For each game mode, the messages from the Player's Message List are displayed (180). As the messages are displayed or get used up, messages are deleted or marked up for frequency in the Player's Message List 134 (182).

Global Computer Network Function 344

In global computer network applications, the hide and seek game software resides on a game server computer. Players are using their computing devices connected to the global computer network to play the game hosted on the server computer. A team of players representing the hide character or seek character may participate in the game. The server computer manages the game execution over the global computer network by processing data files and executing executable program files over the global computer network between the computing devices.

The game may be played by players using the same computing device connected to the game server on the global computer network, where each player takes his turn for the hide and seek parts of the game. The game may also be is played using different computing devices connected to the game server on the global computer network. It may also be played by a team of players that are on geographically dispersed computing devices connected to the game server on the global computer network. When the players are geographically dispersed, they communicate with each other on the global computer network via the game server. The players as part of playing the game communicate with each other via a player to player communication space (21) as shown in FIGS. 1 and 2.

The software and global computer network technology that supports a central and distributed execution of the game software is prior art. Underlying instant messaging technology that would support communication between players is prior art and is widely used on the global computer network.

Global Computer Network Operation

FIG. 11 shows a flow chart of the global computer network application. Player 1 establishes a connection to the game server and enters his player identification and play-group identification (200). Similarly player 2 establishes connection to the game server and enters his player identification and play-group identification (202). The play group identification is a means to let the game server know that the players are part of the same game. Game server sends to each player in the play group the game rule executable file for display of the game rules to each of the players (204) and each player's browser displays the hide character and seek character game screen in the Rule mode (206). The global computer network communication window (21) as shown in FIGS. 1 and 2 is used to communicate between the players. Each player types in the communication space, the game strategy that defines who will play what roles of the hide character and seek character (208). The game strategy is communicated to all the players in the play-group by the game server (210) and is displayed in the communication window (21) of each player (212). When the game strategy is finalized after communication between players, the game server assigns the hide and seek character to each player in the play group (214). Alternatively, the game strategy may be discussed and agreed among the players by other communication means such as voice telephone or e-mail.

One of the players selects the SETUP mode. The Mode transition is sent to the game server (216). The game server sends to each player the SETUP mode executable files (218). Players communicate among each other via the communication window (21) or alternatively, by voice telephone to complete the setup (220). The hide character selects the Hide mode and the mode transition is sent to the game server (222) and the game server sends back the Hide mode executable file (224). The hide character takes action to hide and when he is finished he turns the hide character screen on. The hide character data that has been saved in the executable file is sent to the game server (226). The Hide executable file may send the hide data periodically to the game server, enabling the game server to update the display of the other players. Game server sends a message to the Seek player to begin Seek mode (228). The seek character selects Seek mode and a mode transition is sent the game server. It sends the Seek executable file to seek character computer (230). The seek character begins the seeking phase of the game (232). The Seek executable file may send the seek data periodically to the game server, enabling the game server to update the display of the other players. The seek character and the hide character may communicate with each other while the seek character is seeking. The seek character may find or may not find hide character location. The seek character may ask hide character for location clue or may use the built in clues (234). After the hide character is found, the score is calculated, player may select another setup mode to play another game with role reversal or exit the game (236).

What has been described is an educational game with hide and seek characters that has (I) apparatus, (ii) game software, (iii) different types of landscapes, (iv) message selection and display, and (v) a global computer network-based application of the game. Although the present invention has been described in considerable detail with respect to certain preferred versions thereof, other versions are possible. Therefore, the spirit and scope of the appended claims should not be limited to the descriptions of the preferred versions contained herein.

Therefore, what is claimed is:

1. A game comprised of:
   a game software operative within a computing device, the game software enabling display of a landscape with a plurality of features, wherein, the landscape is a visual simulated representation of elements from a group of space, earth, and fluid; and
   the game software enabling display and movement of a hide character, wherein the hide character moves over the landscape and hides in the features, and only then enabling display and movement of a seek character over the landscape to seek the hide character.

2. The game of claim 1, wherein the hide character and the seek character are from a group of forms representing animal forms, human forms or mythical creature forms.

3. The game of claim 2, wherein the forms have an evolution scale representing hide and seek ability of speed of movement, memory and intelligence.

4. The game of claim 1, wherein the hide character selects from a selection of landscape feature types.

5. The game of claim 1, wherein the hide character deposits clues on the landscape for subsequent use of the seek character.

6. The game of claim 1, wherein the seek character uses a search sensor to aid in seeking the hide character.

7. The game of claim 1, wherein a scoring system is based on time used and distance traveled by the seek character in finding the hide character.

8. The game of claim 1, wherein the landscape is in a central area, surrounded by a surrounding area, wherein the surrounding area has plurality of message spaces and the message spaces are used by a message function to select and display messages from a message database.

9. The game of claim 1, wherein the game software enabling effects from a group of rain, fog, night, day, and clouds to obscure visibility on the landscape.

10. The game of claim 1, wherein the landscape is a visual representation that is selected from a group that includes (i) world-wide-web network overlaid over a world map, (ii) civilizations and their artifacts overlaid over a world map, (iii) universe with features of galaxies, solar systems and planets, (iv) a body of fluid with features of microbes, cell organisms, virus bodies and anti-bodies, (v) a land with features of buildings, trees, water and caves, and (vi) an inside of a building with features of rooms, hallways, furniture, stairs, furnishings, and decorative artifacts.

11. The game of claim 1, wherein the landscape is partitioned in a plurality of hierarchical dimensions, permitting the hide and seek character to move in a hierarchy of the landscape.

12. The game of claim 1, wherein the game software enabling hide and seek characters that are geographically dispersed using separate computing devices connected on a computer network.

13. The game of claim 1, wherein players representing the hide and seek characters sign on to the game software by an identification means embedding age, gender and geographic location of the players.

14. The game of claim 13, additionally comprising:
   a message function enabling entry, selection and display of messages based on, the age, the gender and the geographic location of the players.

15. A hide and seek game apparatus comprising:
   a setup function, enabling set up of a landscape of a visual simulated representation of elements from a group of space, earth and fluid;
   a hide function enabling movement and hiding of a hide character in the landscape; and
   a seek function, enabling movement and seeking by a seek character to seek the hide character in the landscape, the hide function being not operative when the seek function is operative.

16. The game apparatus of claim 15, wherein the setup function further comprising a character function enabling the set up of identities of the hide and seek characters.

17. The game apparatus of claim 15, wherein the setup function further comprising a landscape function enabling the set up of the landscape with a variable grid size representing levels of complexity.

18. The game apparatus of claim 15, wherein the landscape is in a central area, surrounded by a surrounding area, whereby the surrounding area is used for placing hide and seek game controls and as a message space.

19. The game apparatus of claim 15, wherein, the hide function further comprising a clue function enabling deposit of clues by the hide character on to the landscape.

20. The game apparatus of claim 15, wherein the seek function further comprising a sub-function enabling the seek character use of a search sensor aiding the seeking of the hide character in the landscape.

21. A hide and seek game on a global computer network comprised of:

a server on the global computer network hosting a hide and seek game software;

the game software sending and receiving program and data files to a plurality of computing devices for enabling display of a hide character, a seek character, and a landscape, with a plurality of features, wherein the landscape is a visual simulated representation of elements from a group of space, earth and fluid;

the program and data files enabling the hide character to move over the landscape and hide in the features, and only then enabling the seek character to move over the landscape and seek the hide character; and the server enabling the plurality of computing devices to communicate with each other.

22. The game of claim 21, wherein the game software further comprising a message function and a message database, wherein the message function selecting a plurality of messages from the database on a predetermined criterion and sending to the computing device for display around the landscape.

23. The game of claim 22, wherein the message database further comprising a web interface enabling entry of messages in the message database.

24. The game of claim 23, wherein the web interface enabling entry of messages based on age, gender, and geographic region of players representing hide and seek characters.

* * * * *